(12) United States Patent
Yoneda et al.

(10) Patent No.: US 8,553,348 B2
(45) Date of Patent: Oct. 8, 2013

(54) DISK DRIVE AND SERVO-CONTROL METHOD THEREFOR

(75) Inventors: Isao Yoneda, Kanagawa (JP); Kazuhisa Shishida, Kanagawa (JP); Chikako Sakagami, Kanagawa (JP); Katsuhiko Ohta, Tokyo (JP); Kenji Okada, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 640 days.

(21) Appl. No.: 12/824,160

(22) Filed: Jun. 26, 2010

(65) Prior Publication Data

US 2010/0328810 A1    Dec. 30, 2010

(30) Foreign Application Priority Data

Jun. 27, 2009  (JP) ................................ 2009-153070

(51) Int. Cl.
*G11B 21/02* (2006.01)
(52) U.S. Cl.
USPC ..... 360/75; 360/77.02; 360/77.04; 360/78.04
(58) Field of Classification Search
None
See application file for complete search history.

(56) References Cited

U.S. PATENT DOCUMENTS

| | | | |
|---|---|---|---|
| 5,404,418 A * | 4/1995 | Nagano | 388/806 |
| 5,854,722 A | 12/1998 | Cunningham et al. | |
| 6,219,196 B1 * | 4/2001 | Semba et al. | 360/75 |
| 2002/0093754 A1 * | 7/2002 | Zhang et al. | 360/77.04 |
| 2003/0206365 A1 | 11/2003 | Ho et al. | |
| 2004/0013056 A1 | 1/2004 | Ando | |
| 2004/0105294 A1 * | 6/2004 | Kisaka | 365/145 |
| 2006/0119978 A1 | 6/2006 | Kim et al. | |
| 2008/0030160 A1 | 2/2008 | Takaishi | |

FOREIGN PATENT DOCUMENTS

| | | |
|---|---|---|
| JP | 5109217 | 4/1993 |
| WO | WO-2009/057457 | 5/2009 |

\* cited by examiner

*Primary Examiner* — Andrew L Sniezek (57) ABSTRACT

A disk drive. The disk drive includes a head, an actuator, and a controller. The head accesses a disk. The actuator is configured to support the head and to move the head by action of a voice-coil motor in a substantially radial direction of the disk. The controller is also configured to perform servo control of the actuator by using servo data read out by the head. The controller includes at least one of a plurality of notch filters having a fixed center frequency inserted in a servo-control loop. The controller is configured to increase an attenuation rate by at least one of the plurality of notch filters having the fixed center frequency at a designated frequency, when a target position of the head is at a position selected from the group consisting of a position outside of a specified region and a position within the specified region.

16 Claims, 8 Drawing Sheets

DISK DRIVE AND SERVO-CONTROL METHOD THEREFOR

CROSS-REFERENCE TO RELATED APPLICATION

This application claims priority from the Japanese Patent Application No. 2009-153070, filed Jun. 27, 2009, the disclosure of which is incorporated herein in its entirety by reference.

TECHNICAL FIELD

Embodiments of the present invention relate to a disk drive and a servo-control method, in particular, to a vibration suppression technique for an actuator in the servo control of a head.

BACKGROUND

A device using various types of disks, such as optical disks, magneto-optical disks, or flexible magnetic-recording disks, is known as a disk drive. Of these, a hard-disk drive (HDD) is used in many electronic devices, such as video recording and playback devices and car navigation systems, in addition to computer systems.

A magnetic-recording disk used in a HDD has a plurality of data tracks and a plurality of servo tracks formed in concentric circular shapes. Each servo track is included of a plurality of servo sectors containing address information. In addition, each data track is included of a plurality of data sectors containing user data. The data sectors are recorded between the servo sectors which are separated in the circumferential direction.

A HDD includes a rotary actuator, and a head-slider that is supported by the actuator. The HDD reads out the address information in the servo sector by using the head-slider, and controls the actuator in accordance with the address information, which is servo-control information. Thus, the HDD can move the head-slider, in an operation known by the term of art, "seek," to the desired radial position, which is a target data track, and position the head-slider at the target data track, in an operation known by the term of art, "track following." The head-slider positioned at the target data track writes data to, or reads data from, the target data sector in the track.

The actuator is driven by a voice-coil motor (VCM). Generally, the actuator is known to exhibit mechanical resonance at a specific frequency, referred to as a resonant frequency. In the servo control of the head-slider, which is attached to the actuator, when the actuator starts to resonate mechanically at the resonant frequency, the amplitude at the resonant frequency is superimposed on the servo signal which is read out, and the servo control of the head-slider becomes unstable.

Therefore, a conventional HDD uses a notch filter in the servo control of the head-slider, as is known in the art. The notch filter is inserted on the output side of the controller in the servo-control loop of the head-slider, and has a center frequency that is the same as the resonant frequency of the actuator. The notch filter lowers the servo gain at the resonant frequency included in the control signal, and stabilizes the servo control of the head-slider.

SUMMARY

Embodiments of the present invention include a disk drive. The disk drive includes a head, an actuator, and a controller. The head accesses a disk. The actuator is configured to support the head and to move the head by action of a voice-coil motor in a substantially radial direction of the disk by rotation about a pivot shaft. The controller is also configured to perform servo control of the actuator by using servo data read out by the head. The controller includes at least one of a plurality of notch filters having a fixed center frequency inserted in a servo-control loop. The controller is configured to increase an attenuation rate by at least one of the plurality of notch filters having the fixed center frequency at a designated frequency, when a target position of the head is at a position selected from the group consisting of a position outside of a specified region and a position within the specified region.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Figure 7:
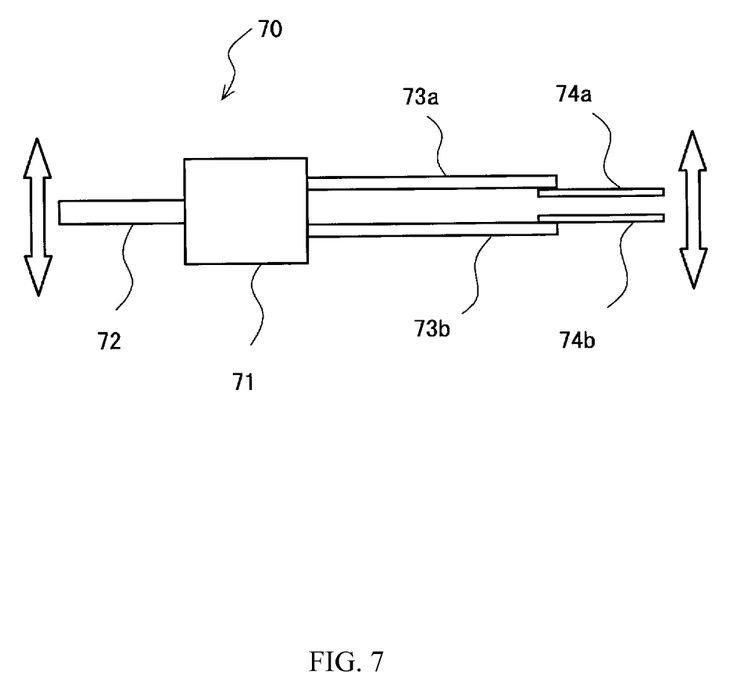
FIG. 7 is a view schematically showing the oscillations of the voice coil and the arm of the actuator, with relevance to embodiments of the present invention.

Description of Embodiments of the Present Invention for Disk Drive and Servo-Control Method Therefore With reference now to FIG. 7, with relevance to embodiments of the present invention, an actuator 70 is shown that includes a voice coil 72 and an arm 73 which are disposed on opposite sides of a pivot shaft 71. A head gimbal assembly (HGA) 74a and 74b is secured to the front end of the respective arm 73a and 73b. During seeking or track following, the voice coil 72, the arms 73a and 73b, and the HGAs 74a and 74b oscillate in the vertical direction. The resonant frequency of the oscillation, which is referred to as "pitching," in the vertical direction of the voice coil 72 is separated from the resonant frequency of the oscillation, which is referred to as pitching, in the vertical direction of the arms 73a and 73b and HGAs 74a and 74b. If these values coincide or are close values, the oscillations of the voice coil 72 and the oscillations of the arms 73a and 73b, and similarly HGAs 74a and 74b, overlap; the head-slider, which is attached to actuator 70, has large oscillations; and unstable operation may be exhibited.

However, there are many constraints on the actuator design. Of these, the resonant frequency of the voice coil and the resonant frequency of the HGA are at close positions. Furthermore, there are variations in the manufacture of the actuators. Even if the two resonant frequencies in the design are separated to the extent that unstable operation does not occur, the values of the resonant frequencies become closer due to manufacturing variations.

If the two resonant frequencies are close, and the oscillations at those frequencies cannot be excited, the servo control of the head-slider, which is attached to the actuator, does not become unstable. However, the inventors discovered that large oscillations were exhibited when the head-slider, which is attached to the actuator, in a specific HDD was in a specific region on the magnetic-recording disk. Specifically, in a HDD with ramp load/unload, which includes specific VCM and actuator structures, the head-slider exhibits particularly large oscillations, when the head-slider is further on the inner circumferential side than a specific radial position, which is associated with the servo track.

Figure 8:
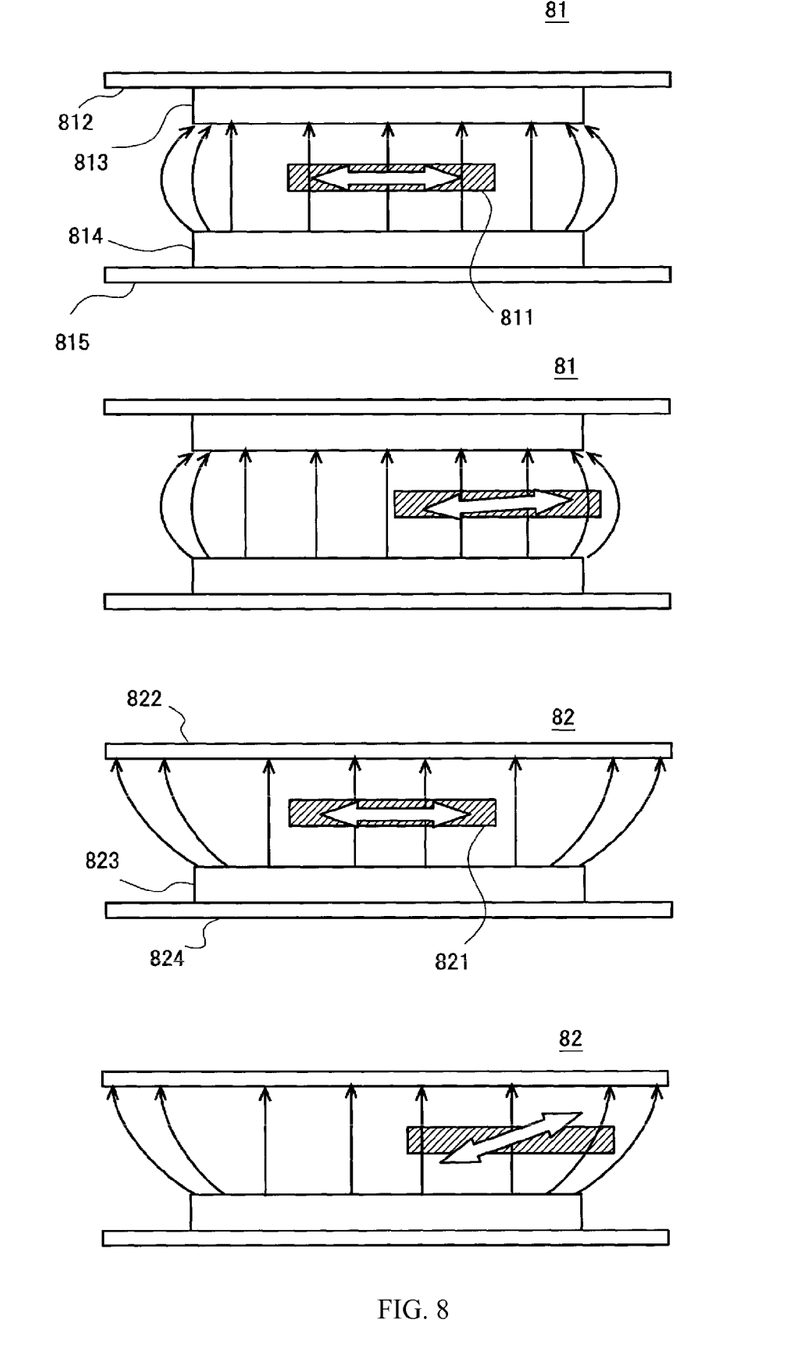
FIG. 8 is a view schematically showing the relationship between the change in position of the voice coil and the drive force received by the voice coil during actuator operation, with relevance to embodiments of the present invention.

In studies by the inventors, the oscillations of the voice coil were found to change in response to the position of the coil in the VCM. FIG. 8 schematically shows the relationship between the coil position and the force received by the coil in two different structures of the VCM. The topmost drawing and the drawing below schematically show a VCM structure 81 with two magnets. The bottom drawing and the drawing above schematically show the VCM structure 82 with one magnet. These drawings depict the VCM seen from the voice coils 811 and 821, respectively, towards the pivot shaft. In the second and bottom drawings, the actuator is positioned in the inner circumferential region above the magnetic-recording disk.

The VCM 81 having a two magnet structure includes an upper yoke plate 812, an upper magnet 813, a lower magnet 814, and a lower yoke plate 815. A voice coil 811 is positioned between the upper magnet 813 and the lower magnet 814. The voice coil 811 moves in the horizontal direction in the drawing in response to the drive current. The VCM 82 having the one magnet structure includes an upper yoke plate 822, a magnet 823, and a lower yoke plate 824. A voice coil 821 is positioned between the upper yoke plate 822 and the magnet 823. The voice coil 821 moves in the horizontal direction in the drawings in response to the drive current.

The voice coils 811 and 821 receive the drive force in the direction perpendicular to the drive current and to the magnetic flux. As shown in the topmost drawing and the third drawing, in the center of the magnet, which is in the horizontal direction, the magnetic flux has the direction parallel to the vertical direction, which is perpendicular to the drive current of the coil. Therefore, when the voice coils 811 and 821 are at the center in the magnet structure, the voice coils 811 and 821 receive force in the direction perpendicular to the pivot shaft. However, as shown in the second drawing from the top or the bottom drawing, the magnetic flux is offset from the vertical direction at the ends of the magnet.

As shown in FIG. 8, in the VCM 82 having the one magnet structure, the warping of the magnetic flux at the ends of the magnet is particularly large. Therefore, when the voice coil 821 approaches an end of the magnet, the direction of the received drive force is offset from the horizontal direction. The drive force has a component in the vertical direction, as shown in the bottom drawing. The component in the vertical direction of this drive force causes oscillations in the vertical direction of the voice coil 821.

In the HDD with ramp load/unload, when the voice coil is positioned on the outermost circumferential side, the actuator is on the ramp and is not above the magnetic-recording disk. Therefore, generally, the voice coil is not positioned near an end of the magnet even when the head-slider is near the outer circumferential edge of the magnetic-recording disk. On the other hand, when the head-slider, which is attached to the actuator, is at the innermost circumferential position above the magnetic-recording disk, the voice coil is at a position close to an end of the magnet. Therefore, when the head-slider is in the region on the inner circumferential side from the specific radial position on the magnetic-recording disk, the head-slider, which is attached to the actuator, exhibits large oscillations.

In the VCM 81 having the two magnet structure, the magnetic flux at the ends of the magnet is roughly perpendicular as in the center of the two magnets, which is in the vertical direction. The warp of the magnetic flux is very small compared to the VCM 82 having the one magnet structure. Therefore, the vertical component in the drive force of the voice coil 811 is small, and the oscillations in the vertical direction of the voice coil 811 are also small. However, in contemporary HDDs, the track pitch gradually narrows because the recording density is improved. Even in the VCM 81 having the two magnet structure the coil oscillations near the ends of the magnet are suppressed.

In accordance with embodiments of the present invention, a disk drive includes a head, an actuator, and a controller; the head accesses a disk; the actuator is configured to support the head and to move the head by action of a voice-coil motor in a substantially radial direction of the disk by rotation about a pivot shaft; and, the controller is configured to perform servo control of the actuator by using servo data read out by the head. As used herein, the term of art "substantially" with respect to the motion of the actuator in a "substantially" radial direction of the disk means that the actuator moves both from the inside diameter of the disk towards the outside diameter of the disk and towards the inside diameter of the disk from the outside diameter of the disk in an arcuate path determined by the rotary motion of the actuator that allows a head-slider attached to the actuator to access various radii of the disk.

Also, as used herein, "access" is a term of art that refers to operations in seeking a data track of a magnetic-recording disk and positioning a magnetic-recording head on the data track for both reading data from, and writing data to, a magnetic-recording disk. In accordance with embodiments of the present invention, the controller includes one or a plurality of notch filters having a fixed center frequency inserted in a servo-control loop; the controller is configured to increase an attenuation rate by at least one of the plurality of notch filters having the fixed center frequency at a designated frequency, when a target position of the head is at a position selected from the group consisting of a position outside of a specified region and a position within the specified region. Thus, in accordance with embodiments of the present invention, the resonance of the actuator caused by the oscillations of the VCM can be suppressed; and, the servo control of the head can be stabilized.

In one embodiment of the present invention, the controller is configured to increase the attenuation rate before the seek to the target position starts, when the target position is in the specified region. Thus, in accordance with embodiments of the present invention, more stable servo control is achieved.

In another embodiment of the present invention, the controller is configured to increase the attenuation rate by enabling the notch filter having the center frequency at the specified frequency. Thus, in accordance with embodiments of the present invention, the attenuation rate can be increased by a simple control. In another embodiment of the present invention, one or the plurality of notch filters having the fixed center frequency includes a first notch filter that is configured to continuously operate, and a second notch filter that has the same center frequency as the first notch filter and is enabled, or alternatively, disabled, by the controller. Thus, in accordance with embodiments of the present invention, the resonance of the actuator caused by the oscillations of the VCM can be effectively suppressed. In another embodiment of the present invention, the gain at the center frequency of the second notch filter is less than the gain at the center frequency of the first notch filter. Thus, in accordance with embodiments of the present invention, the oscillations in the specified region can be reliably prevented.

In another embodiment of the present invention, the disk drive also includes a ramp configured to provide a stop position for the actuator and positioned near the outer circumferential edge of the disk. The specified region is the region in the inner circumferential side from a specific radial position on the disk. Thus, in accordance with embodiments of the present invention, in a disk drive having a ramp, the resonance of the actuator caused by the oscillations of the VCM can be suppressed; and, the servo control of the head can be stabilized in a simple structure.

In another embodiment of the present invention, the VCM includes a one magnet structure. The VCM having a one magnet structure easily causes larger oscillations near the ends of the magnet.

In one embodiment of the present invention, the actuator supports a plurality of heads; and, the specified range for each of the plurality of heads is preset.

In another embodiment of the present invention, the controller is configured to mix noise having different frequencies in the servo-control loop at each different radial position, to measure the servo gain at the respective frequencies, and to determine the specified range from the results of the measurements at different radial positions.

In another embodiment of the present invention, three or more regions are defined on the disk. A different attenuation rate is defined at the specified frequency for each region. The specified region is the region having the largest attenuation rate of the three or more regions. Thus, in accordance with embodiments of the present invention, more accurate servo control is possible by suppressing oscillations of the VCM in response to the radial position.

Another embodiment of the present invention is a servo-control method for a disk drive. The method includes: accessing a disk with a head; supporting the head on an actuator; moving the head in a substantially radial direction of the disk by rotating the actuator about a pivot shaft by action of a voice-coil motor; reading out servo data from the disk with the head; performing servo control of the actuator based on read-out servo data; and, increasing an attenuation rate at a specified frequency of one or a plurality of notch filters having a fixed center frequency inserted in the servo-control loop, when a target position of the head is at a position selected from the group consisting of a position located outside of a specified region and a position within the specified region. Thus, according to embodiments of the present invention, the resonance of the actuator caused by oscillations of the VCM can be suppressed; and, the servo control of the head can be stabilized by using a simple structure in the disk drive.

Embodiments of the present invention are next described for a hard-disk drive (HDD), which is an example of a disk drive. In accordance with embodiments of the present invention, the HDD includes one or a plurality of notch filters having a fixed center frequency in a servo-control system, which includes a servo-control loop. The notch filter acts to suppress the resonance of the actuator in the servo control of the head. The HDD controls at least one notch filter in response to the radial position of the head-slider. Specifically, when the head-slider is in the specified region above the magnetic-recording disk, the HDD increases the attenuation rate by one or a plurality of notch filters at the specified frequency. Thus, in accordance with embodiments of the present invention, the resonance of the actuator caused by the oscillations of the VCM driving the actuator can be suppressed; and, unstable servo control of the head-slider can be prevented.

Figure 1:
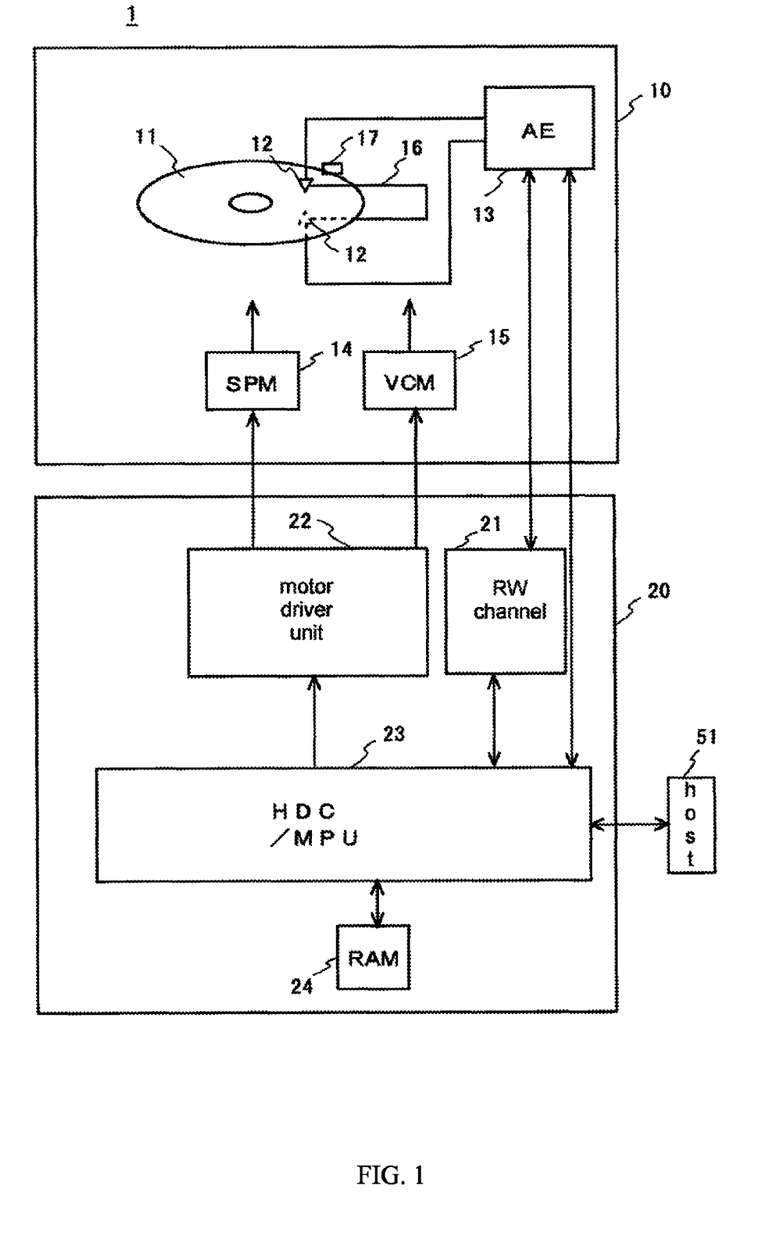
FIG. 1 is a block diagram schematically showing the structure of a hard-disk drive (HDD), in accordance with an embodiment of the present invention.

With reference now to FIG. 1, in accordance with an embodiment of the present invention, a block diagram of HDD 1 is shown. HDD 1 includes a magnetic-recording disk 11, which is the disk for recording the data, in a disk enclosure (DE) 10. A spindle motor (SPM) 14 rotates the magnetic-recording disk 11 at a designated angular velocity. A head-slider 12 for accessing the magnetic-recording disk 11 is provided for each recording surface of the magnetic-recording disk 11. As previously described, access is the term of art that refers to operations in seeking a data track of the magnetic-recording disk 11 and positioning a magnetic-recording head on the data track for both reading data from, and writing data to, the magnetic-recording disk 11.

Each head-slider 12 is provided with a slider, which flies above the magnetic-recording disk, and a magnetic-recording head, which is secured to the slider and both converts magnetic-recording signals to electrical signals, and electrical signals to magnetic-recording signals. Each head-slider 12 is secured to the front end of an actuator 16. The actuator 16 is connected to a VCM 15 and rotates about the pivot axis to move the head-slider 12 in a substantially radial direction above the rotating magnetic-recording disk 11. The structure of the actuator 16 is the same as the structure described with reference to FIGS. 7 and 8.

The actuator 16 includes a voice coil on the side opposite the head-slider 12 and is disposed on the pivot shaft. The voice coil is included as part of the VCM 15. The flow of the drive current to the voice coil in the presence of the magnetic field due to the magnet of the VCM provides a drive force to the voice coil. At a position where the magnetic flux is not warped, the drive force is in the direction of the tangent to the imaginary circle with the pivot shaft at the center. The present invention can be applied to both a HDD having a VCM with the one magnet structure and a HDD having a VCM with the two magnet structure, but is particularly useful in the HDD having a VCM with the one magnet structure. These VCM structures were previously described with reference to FIG. 8. In the one magnet structure of the VCM, the magnet may be positioned either above or below the voice coil.

A ramp 17 is secured inside the DE 10 close to the outer circumferential edge of the magnetic-recording disk 11. When the power supply of the HDD 1 is off or when idle, the actuator 16 is stopped on the ramp 17 on the outer side of the magnetic-recording disk 11. Typically, the front end projection of the actuator 16 slides on the ramp 17. Embodiments of the present invention can also be applied to a contact start-stop (CSS) HDD, which lands and stops the actuator 16 in a designated region above the magnetic-recording disk 11.

A circuit element is mounted on a circuit board 20 secured to the outside of the DE 10. The motor driver unit 22 drives an SPM 14 and a VCM 15 following the control data from a hard-disk controller/microprocessor unit (HDC/MPU) 23. A random access memory (RAM) 24 functions as a buffer for temporarily storing read data and write data. An arm electronics (AE) module 13 in the DE 10 selects the head-slider 12 for accessing the magnetic-recording disk 11 from the plurality of head-sliders 12, and amplifies and sends the read-back signal in a read/write channel (RW channel) 21. In addition, a write signal from the RW channel 21 is sent to the selected head-slider 12. The present invention can be applied to a HDD having only one head-slider 12.

In a read operation, the RW channel 21 amplifies the read-back signal supplied from the AE module 13 to a constant amplitude, extracts data from the acquired read-back signal, and decodes the data. The read-out data include user data and servo data. The decoded read user data and servo data are sent to the HDC/MPU 23. In a write operation, the RW channel 21 code converts the write data sent from the HDC/MPU 23, converts the code-converted write data into a write signal, and supplies the signal to the AE module 13.

The HDC/MPU 23, which is the controller, executes: the read/write process control; command execution order management; positioning control, which is servo control, of the head-slider 12, which is attached to the actuator 16, using the servo data; interface control with the host 51; processes related to data processing, such as defect management and the error handling process, when an error was generated; and, control of the HDD 1.

In one embodiment of the present invention, the HDC/MPU 23 includes a plurality of notch filters connected in series in the servo-control system of the head-slider 12, which is attached to the actuator 16. The HDC/MPU 23 suppresses oscillations of the actuator 16 by controlling the gain of a portion of the notch filters in response to the radial position of the head-slider 1, which includes turning the notch filter on and off.

Specifically, in the specified range on the magnetic-recording disk 11, the attenuation rate is increased by one or a plurality of notch filters at the resonant frequency of the actuator. The notch filter has the minimum gain at the center frequency. The gain at the resonant frequency of the actuator can be decreased by reducing the gain value of one notch filter or overlapping a plurality of notch filters. Thus, in accordance with embodiments of the present invention, the attenuation rate of the control signal at the resonant frequency can be increased; and, resonance of the actuator 16 can be prevented.

HDC/MPU 23 starts a seek when a read/write command is fetched from the host 51. HDC/MPU 23 moves the head-slider 12 to a data track, which is a target data track, of the address indicated by the command from the current radial position. HDC/MPU 23 converts the specified address of the command to the servo address and specifies the target radial position. When the seek ends, HDC/MPU 23 holds the head-slider 12 above the target data track, as a track following operation.

In seeking and track following, HDC/MPU 23 uses the servo data read from the recording surface and controls the actuator 16 through VCM 15. Usually, the seek control controls the actuator 16 through VCM 15 by velocity control and position control using the servo data. In track following control, HDC/MPU 23 controls the positioning to the current radial position, which is given by a servo address, and the target radial position which is given by another servo address, of the head-slider 12 to be in the specified range.

The servo sectors are formed at approximately equal intervals in the circumferential direction on the recording surface. Consequently, the head-slider 12 reads out the servo data at a constant period, which is the servo sampling period. HDC/MPU 23 controls the drive current of the VCM 15 in response to the position error signal (PES) indicating the position error between the current servo address indicating the servo data and the target servo address.

Figure 2:
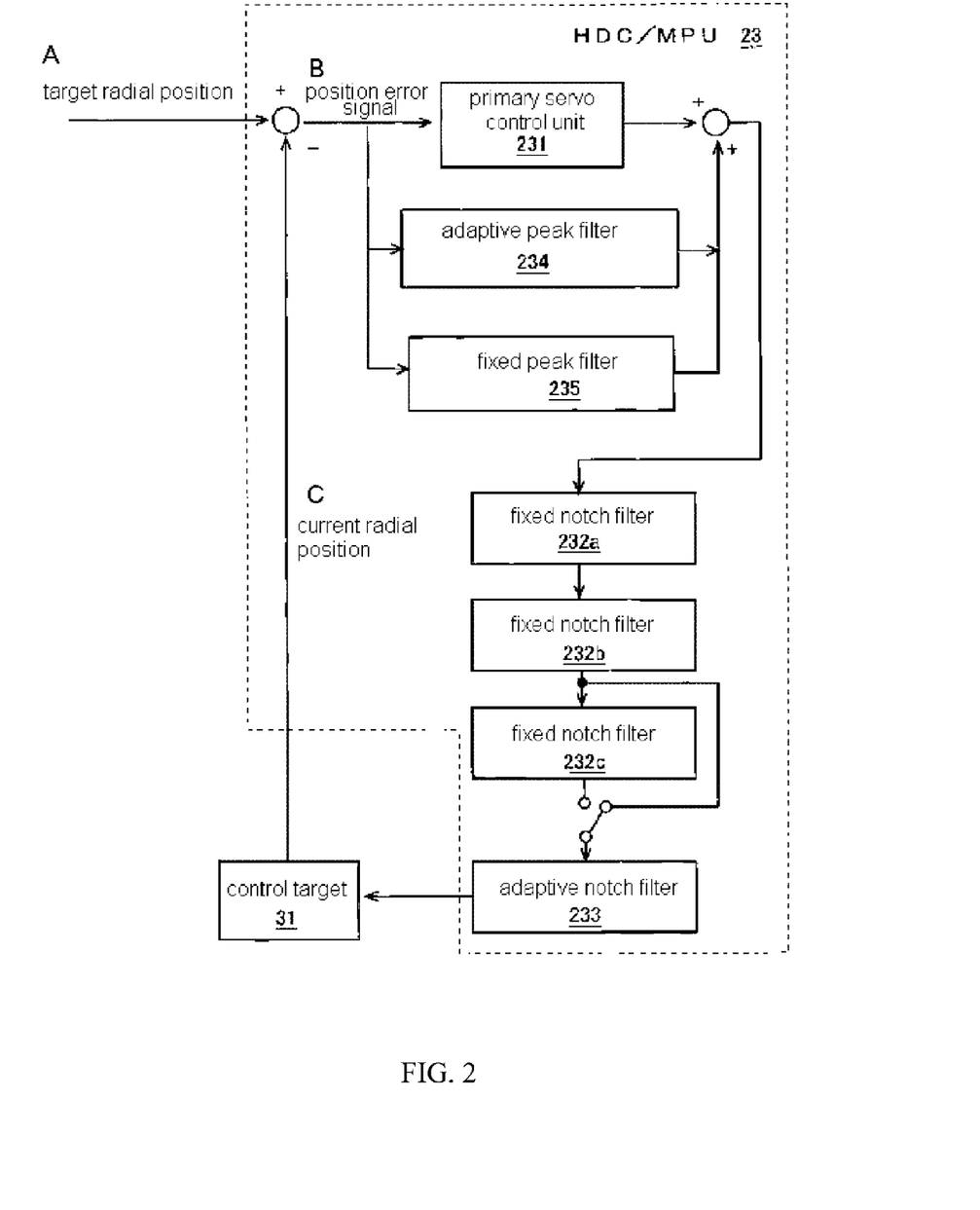
FIG. 2 is a block diagram modeling the servo-control system in the HDD, in accordance with an embodiment of the present invention.

With reference now to FIG. 2, in accordance with an embodiment of the present invention, a block diagram is shown that models the servo-control system in the HDD 1. Each block represents a transfer function. A control target 31 in FIG. 2 is the servo-control target of HDC/MPU 23, and includes: the motor driver unit 22, VCM 15, actuator 16, and head-slider 12. The operating quantity for the control target 31 is the control data from HDC/MPU 23 to the motor driver unit 22 and represents the drive current value provided to the VCM 15. Feedback from the control target 31 is the signal, which is data, indicating the current radial position of the head according to the servo data which was read out by the head-slider 12.

In this structure example, the servo-control system in HDC/MPU 23 includes: a primary servo-control unit 231, fixed notch filters 232a to 232c, adaptive notch filter 233, adaptive peak filter 234, and fixed peak filter 235. The types and number of notch filters and peak filters are appropriately designed. FIG. 2 shows a simplified configuration example for explaining this example. For example, HDC/MPU 23 does not have to have an adaptive filter and may only have the fixed notch filter and the fixed peak filter. Typically, these functional elements are implemented in the hardware in HDC/MPU 23; but, a portion of the functions may be implemented in computations performed by the MPU. In one embodiment of the present invention, the notch filter and the peak filter described above are constructed from hardware and implement the processes without delays.

A primary servo-control unit 231 calculates the VCM current value, which is indicated by control data, in response to the PES. Control by the primary servo-control unit 231 is basically proportional-integral-derivative (PID) control and has difficulty handling large oscillations of the head-slider 12, which is attached to the actuator 16, while maintaining the stability of the control. Therefore, HDC/MPU 23 includes: notch filters 232a to 232c and 233 positioned in series at the output of the primary servo-control unit 231; and, peak filters 234 and 235 connected in parallel to the primary servo-control unit 231.

The notch filters 232a to 232c and 233 primarily operate to suppress the resonance of the actuator 16. Large oscillations can be suppressed at the resonant frequency of the actuator 16 by reducing the component corresponding to the resonant frequency of the actuator 16 in the signal from the primary servo-control unit 231. In this structure, HDC/MPU 23 includes a plurality of fixed notch filters 232a to 232c. The center frequency of the fixed notch filters 232a to 232c is fixed.

Basically, the resonant frequency, which is the frequency where large oscillations are exhibited, of the actuator 16 is found in the design. By preparing the fixed notch filters having a center frequency corresponding to the resonant frequency, the oscillations of the actuator 16 can be effectively suppressed in a simpler structure. An appropriate number of fixed notch filters to be mounted is selected according to the design of the HDD 1.

The resonance of the actuator 16 is changed depending on conditions such as the temperature. Therefore, the adaptive notch filter 233 is installed in the HDD 1 depending on conditions. The adaptive notch filter 233 has variable filter characteristics such as the center frequency, the gain, and the half-width. HDC/MPU 23 suppresses the oscillations of the actuator 16 by the adaptive notch filter 233 by setting appropriate values in the filter characteristics.

The peak filters 234 and 235 operate to suppress the oscillations of the head-slider 12, which is attached to the actuator 16, caused by noise. This noise includes repeatable run out (RRO) caused by disk eccentricity. The fixed peak filter 235 has a peak frequency which is known in advance; and, this frequency operates to suppress constant oscillations. The center frequency, which is the peak frequency, in the fixed peak filter 235 is fixed. Generally, the peak frequency, gain, and filter waveform are constant. An appropriate value is selected for the number of mounted fixed notch filters from the design of the HDD 1.

In contrast, the adaptive peak filter 234 has the operation of suppressing the oscillations of unstable frequencies due to external oscillations. An appropriate number of mounted fixed peak filters and adaptive peak filters is selected according to the design of the HDD 1. In addition, depending upon conditions attending the design, one or both may be omitted.

HDC/MPU 23 generates data, which is a signal, indicating the current radial position of the head-slider 12 from the servo data read out by the head-slider 12 included in the control target 31. HDC/MPU 23 holds data indicating the target radial position specified in commands from the host 51. HDC/MPU 23 calculates the PES, which is data, which is the difference between the target radial position and the current radial position.

The primary servo-control unit 231 performs specific calculation processes on the PES, and calculates the VCM current value for moving the head-slider 12 close to the target radial position, which suppresses the position error. The PES is also input to a plurality of peak filters 234 and 235 connected in parallel to the primary servo-control unit 231. Each of the peak filters 234 and 235 has the maximum gain at the peak frequency, and has a filter waveform in which the gain decreases significantly, when moving away from the peak frequency. Therefore, the specified frequency component in the PES becomes the filter output.

The outputs from the peak filters 234 and 235 are added to the output from the primary servo-control unit 231, and the sum value, which is a signal, is given to the notch filters 232a to 232c and 233. Each of the notch filters 232a to 232c and 233 has minimum gain at the center frequency, and is designed so that the gain and the phase characteristics become stable. Therefore, the servo gain decreases at, and in the vicinity of, the center frequency of the notch filter and becomes stable. The resonance of the actuator 16 is prevented.

In accordance with embodiments of the present invention, HDC/MPU 23 controls one or a plurality of notch filters with a fixed center frequency and decreases the servo gain at the specified frequency in the specified region on the recording surface. The specified frequency is the resonant frequency of the actuator 16, in particular, the frequency where the resonance in the combination of the arm and the head gimbal assembly and the resonance in the VCM 15 are superimposed. As explained with reference to FIG. 8, in the VCM 15, the oscillations of the voice coil are generated by the warp of the magnetic flux in the vicinity of the ends of the magnet. The oscillations of the voice coil increase as the ends of the magnet are approached. In the HDD 1 having the ramp 17 on the outer circumferential edge of the magnetic-recording disk 11, as in the structure example described above, the oscillations of the VCM 15 increase as the head-slider 12 approaches the inner circumferential edge of the recording surface.

Figure 3:
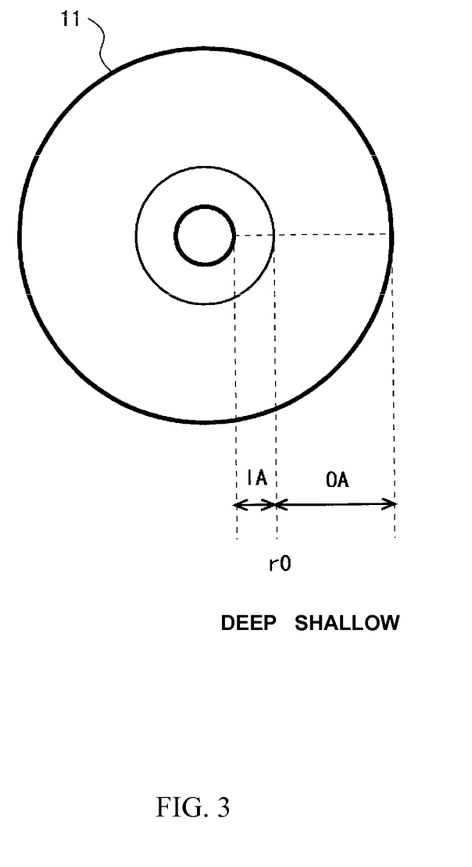
FIG. 3 is a view schematically showing the region where the peak filter is enabled and the region where the peak filter is disabled, in accordance with an embodiment of the present invention.

With reference now to FIG. 3, in accordance with an embodiment of the present invention, HDC/MPU 23 increases the attenuation rate of the servo gain in region IA on the inner circumferential side from the radial position r0 set before that of region OA on the outer circumferential side. Specifically, HDC/MPU 23 reduces the gain at the center frequency of one or a plurality of the operating notch filters, or adds one or a plurality of new notch filters to the servo-control loop. From the perspective of control simplicity, new notch filters may be added. Therefore, HDC/MPU 23 having notch filters added in the inner circumferential region IA is described below, as an embodiment of the present invention.

In the structure example of FIGS. 2 and 3, the filter waveforms, which are characterized by values, such as the gain, center frequency, and half-width, of the notch filters 232a and 232b are invariant, in other words, constant. The fixed notch filters 232a and 232b continuously operate in the servo-control loop. HDC/MPU 23 turns the fixed notch filter 232c on and off. When the fixed notch filter 232c operates, which when the fixed notch filter 232c is enabled, the filter waveforms, which are characterized by values, such as the gain, center frequency, and half-width, are invariant, in other words, constant. In addition, the fixed notch filters 232b and 232c have the same center frequency. When the fixed notch filter 232c is on, the output of the fixed notch filter 232b passes through the fixed notch filter 232c, and is input to the adaptive notch filter 233. When the fixed notch filter 232c is off, the servo-control signal is passed through the fixed notch filter 232c.

Figure 4:
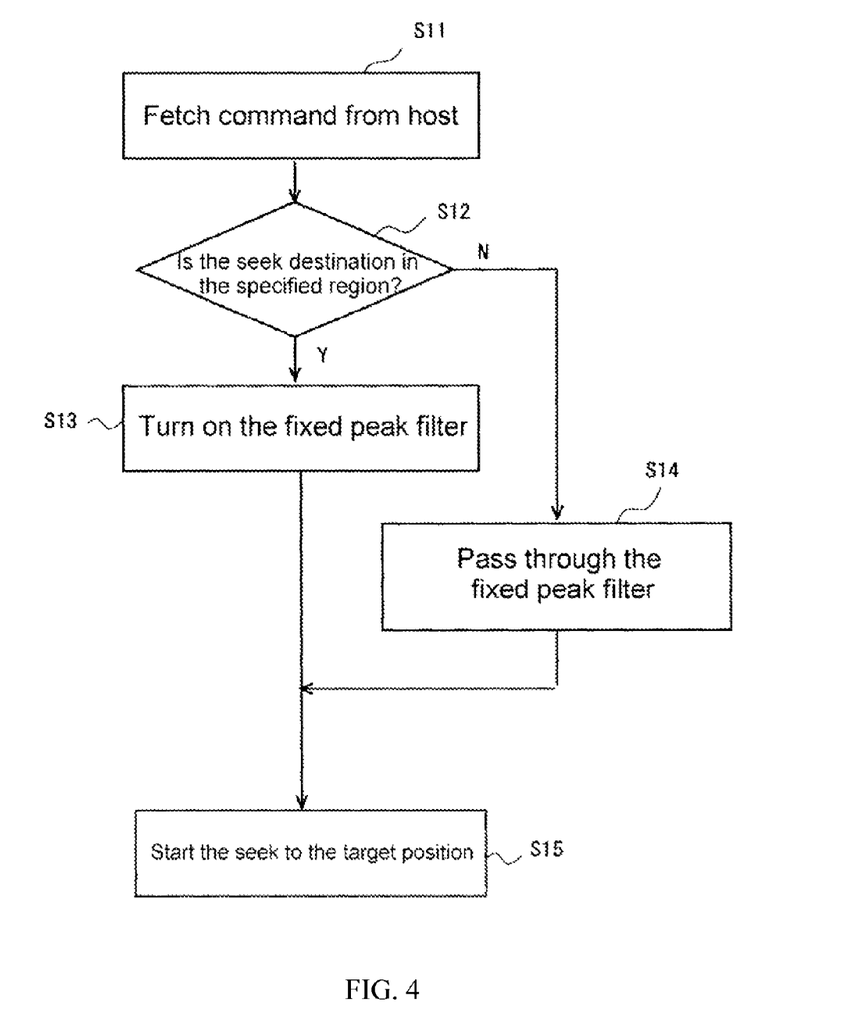
FIG. 4 is a flow chart showing the process flow of control for the peak filter depending on the radial position of the magnetic-recording head, in accordance with an embodiment of the present invention.

With reference now to FIG. 4, in accordance with an embodiment of the present invention, the process flow of HDC/MPU 23 is described with reference to a flow chart. At S11, HDC/MPU 23 fetches read or write commands from the host 51. When the radial position of the address of the seek destination specified by the command is in region IA on the inner circumferential side from the boundary position r0, which occurs at the Y branch after S12, HDC/MPU 23 enables the fixed notch filter 232c. If the current position, which is the track following position before the seek, of the head-slider 12 is in the inner circumferential region IA, the fixed notch filter 232c is enabled already, and the filter state is maintained. When the current position, which is the track following position before the seek, of the head-slider 12 is outside the inner circumferential region IA, namely, in the outer circumferential region OA, the fixed notch filter 232c, which is in the off state, in other words, when the fixed notch filter 232c is disabled, is enabled, and the state of the filter is switched from the off state to the on state.

When the radial position of the address of the seek destination specified by the command is in the region OA on the outer circumferential side from the radial position r0, which occurs at the N branch after S12, HDC/MPU 23 disables the fixed notch filter 232c. When the radial position, which is associated with a track, being followed by the head-slider 12 before the seek is in the outer circumferential region OA, and the fixed notch filter 232c is in the off state, that filter state is maintained. When the radial position, which is associated with a track, being followed by the head-slider 12 before the seek is in the inner circumferential region IA, and the fixed notch filter 232c is in the on state, the filter is set in the off state, at S14. Namely, the fixed notch filter 232c is passed. In the process flow, the processing by the fixed notch filter 232c is skipped.

At S15, HDC/MPU 23 starts a seek to the target position after the fixed notch filter 232c setting is finished. Thus, in accordance with embodiments of the present invention, HDC/MPU 23 resets the fixed notch filters before the seek starts. A reset during a seek, or after a seek ends, lowers the stability of the servo control. HDC/MPU 23 processes as described above for each seek of the head-slider 12. Thus, in accordance with embodiments of the present invention, HDC/MPU 23 enables the fixed notch filter 232c only in the inner circumferential region IA where VCM oscillations are generated, and disables the filter in the outer circumferential region OA.

In another embodiment of the present invention, for stability of the servo control the number of notch filters is low; and, the attenuation rate is low. Therefore, in the outer circumferential region OA where VCM oscillations are not generated, the fixed notch filter 232c is passed through, and the stability of the servo control in the outer circumferential region OA is improved. Thus, in the inner circumferential region IA where VCM oscillations are generated, the unused fixed notch filter 232c can be added in the outer circumferential region OA; and, HDC/MPU 23 can stably perform servo control in the seeking, settling, and track following of the head-slider 12 in a simple structure.

Figure 5:
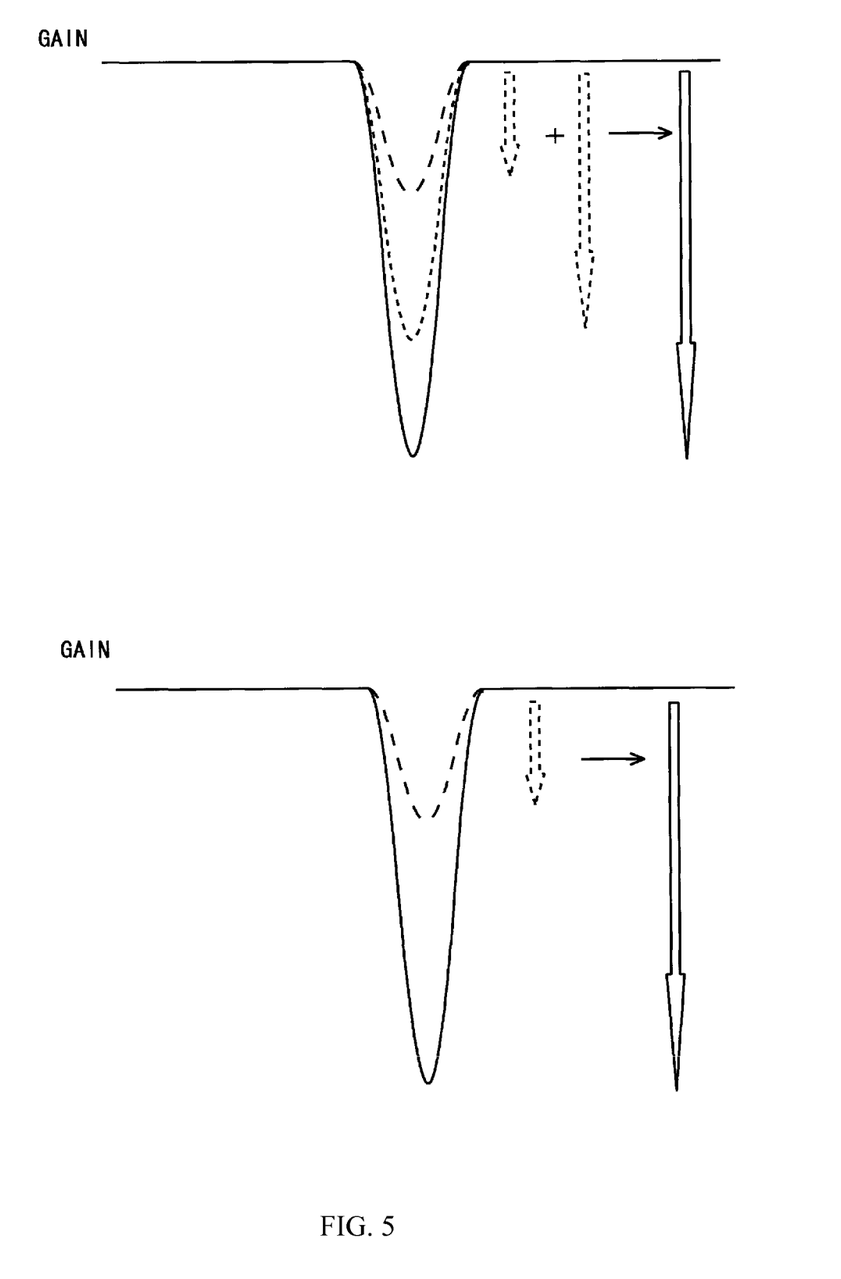
FIG. 5 is a view schematically showing the attenuation rate changes when a peak filter is added, and the attenuation rate changes caused by changes in the gain of one peak filter, in accordance with an embodiment of the present invention.

With reference now to FIG. 5, in accordance with an embodiment of the present invention, the above structure adjusts the attenuation rate and the servo gain by changing the number of notch filters connected in series. In one embodiment of the present invention, HDC/MPU 23 continuously uses a fixed notch filter having the same center frequency as the fixed notch filter, which is enabled, or alternatively, disabled. In the above structure examples, the fixed notch filters 232b and 232c have this relationship. As described above, the oscillations of the arm HGA and the oscillations of the VCM 15 are superimposed; and, large oscillations are generated by the actuator 16.

Therefore, in accordance with an embodiment of the present invention, there are both fixed peak filters for continuously suppressing the oscillations of the arm HGA, and fixed peak filters for suppressing the oscillations of the voice coil generated in the inner circumferential region. If the resonance of the actuator 16 can be suppressed, the center frequencies of two fixed peak filters may be offset slightly.

In another embodiment of the present invention, the attenuation rate of the fixed notch filter 232c for on/off control is larger than the attenuation rate of the fixed peak filter 232b, which is continuously on. Specifically, in an embodiment of the present invention, the gain of the fixed notch filter 232c is smaller than the gain of the fixed notch filter 232b. Thus, in accordance with embodiments of the present invention, the oscillations of the actuator 16 can be effectively suppressed at any position in the inner circumferential region. In addition, when the same settings are made for a plurality of HDDs having the same design, the oscillations of the actuator can be effectively suppressed in the inner circumferential region independent of the manufacturing fluctuations of the HDD.

An appropriate number of fixed notch filters, which are enabled, or alternatively, disabled, is selected based on the design. For example, when the voice coil and the arm HGA have a plurality of close resonant frequencies, a plurality of fixed notch filters can be on, or alternatively, off, corresponding to the radial position. However, in accordance with embodiments of the present invention, from the perspective of stability and simplicity of the servo control, the actuator 16 is designed so that the resonant frequencies of the actuator caused by the superimposing of the oscillations of the voice coil and the arm HGA become at most one; and, one fixed notch filter is enabled, or alternatively, disabled.

As shown in the bottom of FIG. 5, instead of enabling, or alternatively, disabling, the fixed notch filter, HDC/MPU 23 may change the gain of the fixed notch filter which is continuously on in the inner circumferential side and the outer circumferential side of the radial position r0. The center frequency of this notch filter is not changed and is fixed. HDC/MPU 23 includes a deeper notch filter in the inner circumferential region than the outer circumferential region. Thus, in accordance with embodiments of the present invention, stable servo control is possible.

However, the enabling, or alternatively, disabling, of the fixed notch filter can be processed by a 1-bit data process. In order to reset the characteristics of the fixed notch filter, more parameters are set. Consequently, enabling, or alternatively, disabling, the notch filter may be performed instead of changing the characteristics of the notch filter, which include the gain.

In the above structure, HDC/MPU 23 enables, or alternatively, disables, only one notch filter 232c based on only one boundary position r0. From the perspective of stability and simplicity of the control, this structure may be employed. However, depending on the HDD design, the recording surface may be divided into three or more sections, and a different attenuation rate set for each section.

For example, the recording surface is divided into three sections. HDC/MPU 23 includes two fixed notch filters which are enabled, or alternatively, disabled. Two fixed notch filters in the outer circumferential region are in the off state. The only fixed notch filter in the center circumferential region is in the on state. Two fixed notch filters in the inner region are in the on state. When the gain of one fixed notch filter is changed, HDC/MPU 23 may have a successively smaller gain at the center frequency in the outer circumferential region, the center circumferential region, and the inner circumferential region.

HDC/MPU 23 may control the shared notch filters for all of the installed head-sliders 12. However, in one structure, HDC/MPU 23 controls the notch filter for each head-slider 12. Specifically, the setting data of the reference radial position r0 of the notch filter control and the filter characteristics of the fixed notch filter, which is enabled, or alternatively, disabled, are prepared for each head-slider 12. In accordance with one embodiment of the present invention, the characteristics of the other notch filters and the peak filters are set for each head-slider 12. Thus, in accordance with embodiments of the present invention, appropriate servo control can respond to manufacturing fluctuations of the magnetic-recording disk 11 and the actuator 16.

The parameter settings for each head-slider 12 are stored in a magnetic-recording disk 11, or alternatively, in a nonvolatile memory called an electrically erasable programmable read-only memory (EEPROM). The parameter settings determine the filter characteristics of the notch filters and the peak filters in the servo-control loop. In addition, the parameter settings include the parameter specifying the radial position, which becomes the reference for notch filter control. After the HDD 1 starts, the parameter settings are loaded in a RAM 24, or alternatively, a static random access memory (SRAM) in the HDC/MPU 23. As described above, the above-mentioned filters in the servo-control loop are hardware. The MPU resets the parameters of each filter when the head-slider 12 is switched, and acquires the parameters for filter control of the selected head-slider 12 after switching.

In order to set the filter for each head-slider, during the manufacturing of the HDD 1, the appropriate parameters must be determined for each head-slider 12 based on measurements. A method for determining the parameter settings for the fixed notch filter is next described. Specifically, a method is described for determining the reference radial position where the notch filter is enabled, or alternatively, disabled, and the gain of that notch filter.

HDC/MPU 23 calibrates to determine the reference radial position, and the gain following commands from a test device. In the design of the HDD 1, the estimate of the resonant frequency of the actuator 16 caused by oscillations of the VCM 15 is found. HDC/MPU 23 oscillates the actuator 16 at the above estimate and nearby frequencies at different radial positions on the recording surface and measures the servo gain.

Figure 6:
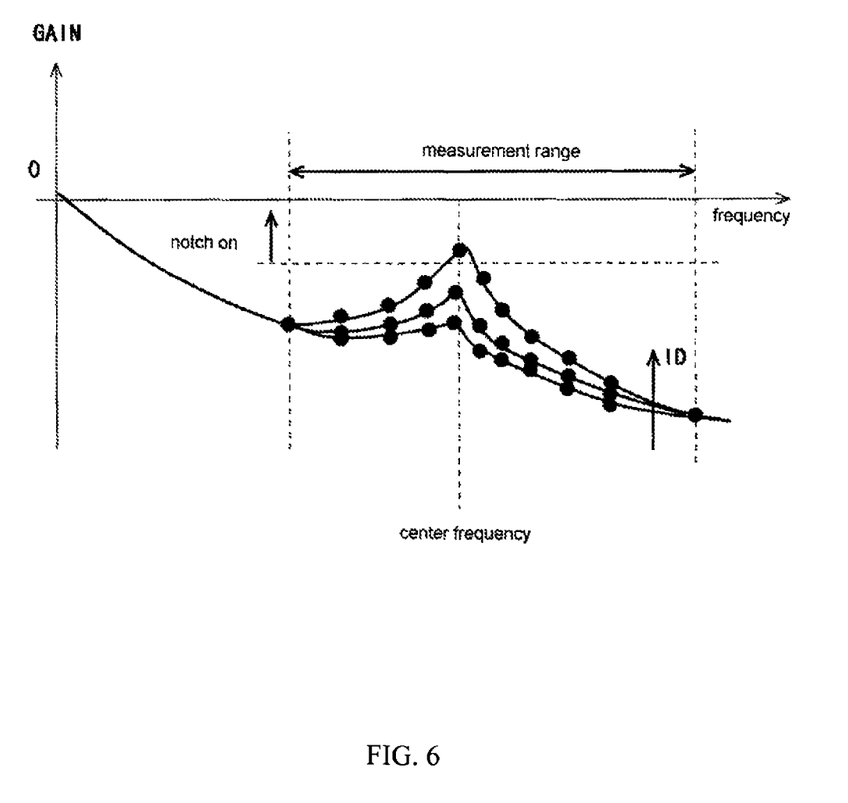
FIG. 6 is a view schematically showing a method for measuring the resonant frequency of the actuator caused by the oscillations of the voice coil and the radial position where resonance starts, in accordance with an embodiment of the present invention.

With reference now to FIG. 6, in accordance with an embodiment of the present invention, the measurement results are shown. In the graph of FIG. 6, the Y axis represents the servo gain; and, the X axis represents the oscillation frequency. Each of the three different lines represents the measurement data at the different radial positions. The gain is large at the radial position at the inner circumference.

In one example, HDC/MPU 23 forms a servo-control loop, which provides a filter configuration, for calibration, mixes noise in the servo-control loop, and measures the servo gain. This servo-control loop includes a different configuration than the servo-control loop shown in FIG. 2, and the gain of the structure is smaller. HDC/MPU 23 may use the servo-control loop shown in FIG. 2. The fixed notch filter 232c is disabled.

HDC/MPU 23 positions the selected head-slider 12 at the specific radial position. Then a plurality of noise having frequencies in the vicinity of the resonance estimate in the measurement range is mixed in, and the servo gain at each frequency is measured. HDC/MPU 23 changes the radial position of the head-slider 12, and repeats the above measurement at a plurality of different radial positions. Thus, measurement data can be obtained as shown in FIG. 6.

HDC/MPU 23 determines the resonant frequency from the measurement data and specifies the radial position indicating the gain where the threshold is exceeded at that frequency. The resonant frequency is the center frequency of the notch filter 232c, or of the two notch filters 232b and 232c; and, the above-mentioned radial position is set to the reference radial position r0 for on/off control of the notch filter. In addition, the gain at the center frequency of the notch filter 232c for on/off control is determined from the servo gain at the innermost circumferential position.

The parameter settings defining the notch filter 232c are efficiently prepared in advance. For example, the parameter settings corresponding to the resonant frequency estimate and nearby frequencies are prepared. When the gain of the notch filter 232c is determined in the design, one parameter setting is prepared for each frequency. When the gain is not determined in advance, a plurality of parameter settings where each one has a different gain is prepared for each frequency. HDC/MPU 23 selects the parameter settings having the optimum center frequency and gain in accordance with the measurement data, and stores the settings in a nonvolatile memory.

As set forth above, embodiments of the present invention have been described by way of examples; but, embodiments of the present invention are not limited to the above-described examples, as embodiments of the present invention can, of course, be modified, added to, and/or elements of the examples converted in various ways within the spirit and scope of embodiments of the present invention. For example, the region for adding a notch filter changes with the design of the HDD. For example, in a CSS HDD, there is a high probability of VCM oscillations in the outer circumferential region. In this case, HDC/MPU 23 adds a notch filter to the region on the outer circumferential side from the reference radial position, or alternatively, decreases the gain of the operating notch filter. Embodiments of the present invention can be applied to a disk drive other than a HDD, whether or not the disk is secured in a cabinet. In accordance with embodiments of the present invention, the center frequency of the notch filter is in the vicinity of the resonant frequency of the actuator, but is not limited to being coincident with the resonant frequency.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive, comprising:
a head for accessing a disk;
an actuator configured to support said head and to move said head by action of a voice-coil motor in a substantially radial direction of said disk by rotation about a pivot shaft; and
a controller configured to perform servo control of said actuator by using servo data read out by said head, said controller comprising at least one of a plurality of notch filters having a fixed center frequency inserted in a servo-control loop;
wherein said controller is configured to increase an attenuation rate by at least one of said plurality of notch filters having said fixed center frequency at a designated frequency, when a target position of said head is at a position selected from the group consisting of a position outside of a specified region and a position within said specified region, and wherein said controller is configured to increase said attenuation rate before a seek starts to said target position, when said target position is within said specified region.

2. The disk drive of claim 1, further comprising:
a ramp positioned in a vicinity of an outer circumferential edge of said disk, said ramp configured to provide a stop position for said actuator; and
wherein said specified region is a region on an inner circumferential side from a specific radial position on said disk.

3. The disk drive of claim 1, wherein said controller is configured to increase said attenuation rate by enabling a notch filter having said designated frequency as said center frequency.

4. The disk drive of claim 3, wherein at least one of said plurality of notch filters having said fixed center frequency includes a first notch filter that is configured to continuously operate, and a second notch filter that has a same center frequency as said first notch filter and is configured to be set by said controller at a state selected from the group consisting of an enabled state and a disabled state.

5. The disk drive of claim 4, wherein a gain at said center frequency of said second notch filter is smaller than a gain at said center frequency of said first notch filter.

6. The disk drive of claim 1, wherein said voice-coil motor comprises a one magnet structure.

7. The disk drive of claim 1, wherein said actuator supports a plurality of heads; and
a respective specified range is preset for each of said plurality of heads.

8. The disk drive of claim 1, wherein said controller is configured to mix noise having different frequencies in said servo-control loop and to measure servo gain at each frequency at each different radial position; and
said specified region is determined from measurements at said different radial positions.

9. The disk drive of claim 1, wherein at least three regions are defined on said disk;
a different attenuation rate is defined at a specified frequency for each of said at least three regions; and
said specified region is a region having a largest attenuation rate of said at least three regions.

10. A servo-control method for a disk drive, said method comprising:
accessing a disk with a head;
supporting said head on an actuator;
moving said head in a substantially radial direction of said disk by rotating said actuator about a pivot shaft by action of a voice-coil motor;
reading out servo data from said disk with said head;
performing servo control of said actuator based on read-out servo data; and
increasing an attenuation rate at a specified frequency of at least one of a plurality of notch filters having a fixed center frequency inserted in said a servo-control loop, when a target position of said head is at a position selected from the group consisting of a position located outside of a specified region and a position within said specified region, and wherein said attenuation rate increases before a seek to said target position starts, when said target position is within said specified region.

11. The method of claim 10, wherein said attenuation rate is increased by enabling a notch filter having said specified frequency set as said center frequency.

12. The method of claim 10, wherein a ramp is positioned near an outer circumferential edge of said disk, said ramp providing a stop position for said actuator; and
wherein said specified region is a region on an inner circumferential side from a specific radial position on said disk.

13. The method of claim 10, wherein at least one of a plurality of notch filters having said fixed center frequency includes a first notch filter that operates continuously, and a second notch filter that has a same center frequency as said first notch filter and is set by said controller to a state selected from the group consisting of an enabled state and a disabled state.

14. The method of claim 13, wherein a gain at said center frequency of said second notch filter is smaller than a gain at said center frequency of said first notch filter.

15. The method of claim 10, wherein said voice-coil motor comprises a one magnet structure.

16. The method of claim 10, wherein noise having different frequencies is mixed in said servo-control loop, and servo gain at each frequency is measured at each of different radial positions; and
said specified region is determined from measurements at said different radial positions.

* * * * *

UNITED STATES PATENT AND TRADEMARK OFFICE
CERTIFICATE OF CORRECTION

PATENT NO. : 8,553,348 B2  
APPLICATION NO. : 12/824160  
DATED : October 8, 2013  
INVENTOR(S) : Isao Yoneda et al.

Page 1 of 1

It is certified that error appears in the above-identified patent and that said Letters Patent is hereby corrected as shown below:

In the Claims

Column 16, Claim 10, Line 9, Delete: "said"

Signed and Sealed this
Twentieth Day of May, 2014

Michelle K. Lee
*Deputy Director of the United States Patent and Trademark Office*